United States Patent Office 2,994,037
Patented July 25, 1961

2,994,037
PHASE COMPARATOR UTILIZING HALL EFFECT
Eugene J. Boyle, Jr., Philadelphia, and Robert G. Mc-
Michael, Malvern, Pa., assignors to Robertshaw-Fulton
Controls Company, Richmond, Va., a corporation of
Delaware
Filed Sept. 21, 1959, Ser. No. 841,185
2 Claims. (Cl. 324—83)

This invention relates to phase comparators which utilize the Hall effect for measuring, recording and controlling the phase angle between two independently generated electrical signals having the same frequency.

The Hall effect is well known and generally refers to the electromagnetic phenomenon observable when a current is passed through a Hall element, disposed in a transverse magnetic field, to induce a potential proportional to the product of the current and the magnetic field strength.

If two signals of the same frequency are separately passed through an electromagnet and a Hall element, the induced Hall potential is proportional to the cosine of the phase angle between the two signals. Consequently, the magnitude of the potential may represent either of two possible phase angles. A primary object of this invention is to determine which of the two possible phase angles this magnitude represents.

Another object of this invention is to eliminate the need for external power by operating the device on the power supplied by the input voltages under test.

A further object of this invention is to allow the device to be operated over a wide range of frequencies and input voltages.

In the preferred embodiment of this invention, the first signal or input voltage is fed to an electromagnet and a pair of Hall elements are operatively disposed in the field of the electromagnet. The second signal, having the same frequency as the first signal, is fed to one of the Hall elements to induce a Hall potential proportional to the cosine of the phase angle between the two signals. The second signal is also fed to a phase shifting network which shifts the current 90° and feeds the resultant signal to the second Hall element to induce a second Hall potential for determining which of the two possible phase angles the first Hall potential represents.

Other objects and advantages of this invention will be apparent from the following description taken in connection with the accompanying drawing wherein.

Figure 1:
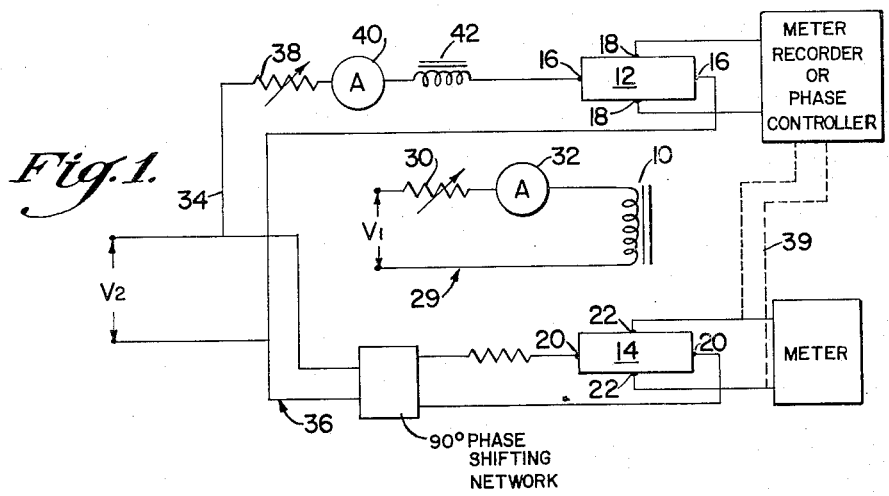
FIG. 1 is a wiring diagram of the preferred embodiment of this invention.

Referring more particularly to FIG. 1, $V_1$ and $V_2$ represent two independent input signals or voltages, having the same frequency, which are to be tested to determine the phase relationship therebetween. Input $V_1$ is fed to an electromagnet 10 and input $V_2$ is fed to Hall elements 12 and 14.

Figure 2:
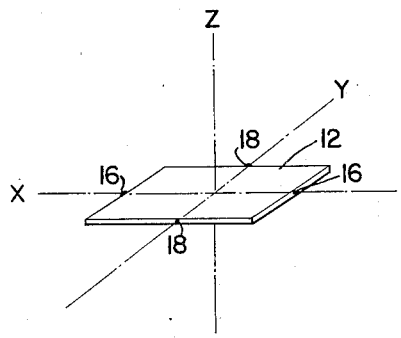
FIG. 2 is a schematic diagram explanatory of the operation of a portion of the device shown in FIG. 1.

Hall elements 12 and 14 operate on the same theory and reference need be made only to one to understand the operation of the other. Hall element 12 is a thin rectangular plate provided with a pair of input terminals 16 and a pair of output terminals 18 which, as illustrated in FIG. 2, are respectively disposed on the X and the Y axes of the element 12. If the current flows through the input terminals 16 along the X axis, and a magnetic field exists in the direction of the Z axis, a Hall potential is induced at output terminals 18 along the Y axis. The Hall potential $E_H$ is given by the equation:

$$E_H = KBI \quad (1)$$

where

K is a constant of proportionality
B is the field flux through the Hall element
I is the current input to the Hall element Let the current to electromagnet 10 be permitted to vary as $I \sin wt$, where $w$ is the radian frequency of the signal and $t$ is the time, then the field will vary as $B \sin wt$. Furthermore, let the current input to Hall element 12 be permitted to vary as $I \sin (wt+\Phi)$ where $\Phi$ is the phase angle between the current inputs to the electromagnet and the Hall element; then the Hall potential $E_H$ is given by:

$$E_H = KBI \sin (wt) \sin (wt+\Phi) \quad (2)$$

This equation, by suitable trigonometric formulae, reduces to:

$$E_H = KBI \cos (\Phi) - KBI \cos (\Phi+2wt) \quad (3)$$

The first term of Equation 3 is a D.C. term which is constant for a given phase angle $\Phi$ assuming, of course, that the product KBI does not vary. The second term of Equation 3 is the second harmonic current output and has an average value of zero.

Figure 3:
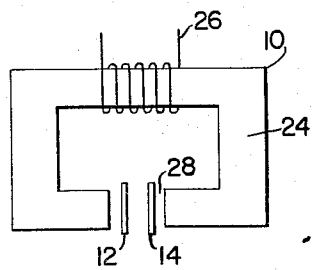
FIG. 3 is a somewhat schematic view of a detail of the device shown in FIG. 1.

As illustrated in FIG. 3, electromagnet 10 may be one of many well known types in which a core 24 is energized by a coil 26 to produce a concentrated magnetic field in the air gap 28 between the ends of the poles of core 24. Hall elements 12 and 14 are operatively positioned within air gap 28 so that the direction of the magnetic field is transverse to the planes of elements 12 and 14.

Referring now to FIG. 1, input $V_1$ is fed to a first circuit 29 which includes a variable resistor 30, an ammeter 32, and electromagnet 10. Resistor 30 is adjusted to maintain the current, as read by ammeter 32, at a constant level. In effect, this maintains the "B" component of Equation 3 constant.

Input $V_2$ is fed to a pair of parallel circuits 34 and 36. Circuit 34 includes a variable resistor 38, an ammeter 40, an impedance coil 42 and the input terminals 16 of Hall element 12. Resistor 38 maintains the current input to Hall element 12 constant, and, in effect, maintains the "I" term of Equation 3 constant. Coil 42 has the same impedance as electromagnet 10 to preclude any inherent internal phase shift. It should be noted that by utilizing resistors 30 and 38 to maintain the "BI" product of Equation 3 constant, that inputs $V_1$ and $V_2$ can be within wide ranges of voltages and frequencies. It might be necessary though, in some instances, to change the resistors 30 and 38 to limit the current to the calibrated level.

Circuit 36 includes a 90° phase shifting network connected to input terminals 20 of Hall element 14 so that the current fed to Hall element 14 is 90° out of phase with the current fed to Hall element 12.

Figure 4:
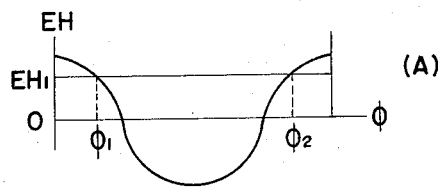
FIG. 4 is a graph which illustrates some of the principles of operation of the device shown in FIG. 1.
Figure 4:
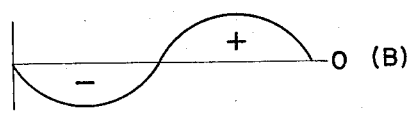

Referring now to FIG. 4, curve A represents the Hall potential vs. phase angle plot for one cycle of the output of Hall element 12, and is a function of the cosine of the phase angle. Curve B is a similar plot for the output of Hall element 14 and is a function of minus the sine of the phase angle ($-\sin \Phi$). It is obvious that the phase shifting network could be made to shift in the other direction so that the output of element 14 is a positive function, rather than a negative function, of the sine of the phase angle.

Any given value $E_{H_1}$ (curve A) of the output of the element 12 represents two possible phase angles, $\Phi_1$ or $\Phi_2$. To determine which is the correct value, it is necessary to refer to the output of element 14; if this is negative, then $\Phi_1$ is the correct value; if it is positive $\Phi_2$ is the correct angle.

The output terminals 18 of element 12 are connected to a meter, recorder or phase controller. If it is a meter, it may be provided with two scales, one being calibrated to indicate phase angles from 0° to 180° and the other from 180° to 360°. The output terminals 22 of element 14 are connected to a meter which may be provided with suitable means for indicating positive or negative values of the output Hall voltage. By referring to this second meter, an operator can determine which of the scales on the first meter is the proper one to read. Alternatively, terminals 22 may be connected directly to the first meter by wires 39 and, by suitable conventional means, cause the first meter to directly indicate the true phase angle.

Many changes and modifications may be made in the details and arrangement of parts without departing from the scope of the invention as defined in the appended claims.

We claim:

1. A phase comparator for determining the phase angle between two sinusoidal signals of a given frequency comprising means responsive to one of said signals providing a constant sinusoidal magnetic field; first and second Hall elements positioned in said magnetic field; means connected to said first Hall element and responsive to said other signal providing a constant sinusoidal input signal to said first Hall element to cause said first Hall element to provide a direct current output potential having a magnitude proportional to and a polarity dependent on the cosine of the phase angle between said two signals; means having said other signal as an input providing an output signal which is shifted 90 electrical degrees with respect to said other signal; means connecting the output of said last mentioned means to said second Hall element to cause said second Hall element to provide a direct current output potential having a polarity dependent on the sine of the phase angle between said two signals; and means responsive to said output potential of said first Hall element and said output potential of said second Hall element providing a measure of the phase angle between said first and second signals.

2. A phase comparator for determining the phase angle between two sinusoidal signals of a given frequency comprising means responsive to one of said signals providing a constant sinusoidal magnetic field; first and second Hall elements positioned in said magnetic field; means connected to said first Hall element and responsive to said other signal providing a constant sinusoidal input signal to said first Hall element to cause said first Hall element to provide a direct current output potential having a magnitude proportional to and a polarity dependent on the cosine of the phase angle between the said two signals; means having said other signal as an input providing an output signal which is shifted 90 electrical degrees with respect to said other signal; means connecting the output of said last mentioned means to said second Hall element to cause said second Hall element to provide a direct current output potential having a polarity dependent on the sine of the phase angle between said first and second signals; a direct current measuring instrument responsive to the polarity and magnitude of the output potential of said first Hall element, said instrument having two scales thereon, one of said scales being calibrated from 180° to 0° and the other of said scales being calibrated from 180° to 360°; and a direct current measuring instrument responsive to the output potential of said second Hall element providing an indication in response to one polarity of said last mentioned second Hall element output potential that said one scale should be read and an indication in response to the other polarity of the output potential of said second Hall element that said other scale should be read.

References Cited in the file of this patent

UNITED STATES PATENTS

| 1,778,795 | Craig | Oct. 21, 1930 |
| 2,436,479 | Luck | Feb. 24, 1948 |
| 2,543,640 | Millar | Feb. 27, 1951 |
| 2,545,369 | Millar | Mar. 13, 1951 |
| 2,595,675 | Jaynes | May 6, 1952 |
| 2,749,516 | Ragazzini et al. | June 5, 1956 |
| 2,760,155 | Kelly | Aug. 21, 1956 |
| 2,788,491 | Millar | Apr. 9, 1957 |

FOREIGN PATENTS

| 802,214 | Great Britain | Oct. 1, 1958 |